US 8,204,918 B2

(12) United States Patent  (10) Patent No.: US 8,204,918 B2
Jung  (45) Date of Patent: Jun. 19, 2012

(54) IMAGE FORMING APPARATUS, IMAGE FORMING SYSTEM AND FILE MANAGING METHOD THEREOF

(75) Inventor: Yang-hun Jung, Gunsan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 355 days.

(21) Appl. No.: 12/182,240

(22) Filed: Jul. 30, 2008

(65) Prior Publication Data

US 2009/0063586 A1  Mar. 5, 2009

(30) Foreign Application Priority Data

Aug. 30, 2007 (KR) .................. 10-2007-0087671

(51) Int. Cl.
*G06F 17/30* (2006.01)
(52) U.S. Cl. ........ 707/821; 707/662; 707/663; 707/664; 707/915; 707/609
(58) Field of Classification Search .................. 382/100, 382/175, 179; 358/1.1, 1.9, 1.15, 1.16, 1.18, 358/3.28; 710/5; 711/156; 707/662–664, 707/915, 609, 821
See application file for complete search history.

(56) References Cited

U.S. PATENT DOCUMENTS

| | | | | |
|---|---|---|---|---|
| 6,070,174 A * | 5/2000 | Starek et al. | ........................... | 1/1 |
| 6,081,341 A * | 6/2000 | Kim | ............................. | 358/1.14 |
| 6,434,343 B1 * | 8/2002 | Kobayashi et al. | ................ | 399/8 |
| 6,446,091 B1 * | 9/2002 | Noren et al. | ............................ | 1/1 |
| 6,480,297 B1 * | 11/2002 | Suzuki et al. | ................ | 358/1.16 |
| 6,795,210 B1 * | 9/2004 | Fujiwara | ....................... | 358/1.18 |
| 6,854,904 B2 * | 2/2005 | Oshino et al. | .................. | 400/103 |
| 6,872,015 B2 * | 3/2005 | Roosen et al. | .................... | 400/61 |
| 6,912,058 B1 * | 6/2005 | Takagi | ............................ | 358/1.1 |
| 6,943,914 B1 * | 9/2005 | Borchers | ......................... | 358/1.6 |
| 6,967,732 B2 * | 11/2005 | Fujiwara | ....................... | 358/1.14 |
| 7,042,593 B2 * | 5/2006 | Matsushima | .................. | 358/1.9 |
| 7,081,964 B2 * | 7/2006 | Takagi | ............................ | 358/1.1 |
| 7,092,117 B2 * | 8/2006 | Kageyama et al. | ........... | 358/1.18 |
| 7,145,679 B2 * | 12/2006 | Hitaka | ........................... | 358/1.15 |
| 7,148,989 B2 * | 12/2006 | Hitaka | ........................... | 358/1.16 |
| 7,158,682 B2 * | 1/2007 | Sano | ............................. | 382/236 |
| 7,202,962 B2 * | 4/2007 | Roosen et al. | ................... | 358/1.15 |
| 7,483,162 B2 * | 1/2009 | Matsushima | ................. | 358/1.15 |
| 7,668,441 B2 * | 2/2010 | Kim | ............................... | 386/212 |
| 7,692,819 B2 * | 4/2010 | Yasukaga et al. | ............. | 358/3.28 |
| 7,710,596 B2 * | 5/2010 | Shibao | ........................... | 358/1.9 |
| 7,716,432 B2 * | 5/2010 | Yoshiura et al. | .............. | 711/156 |
| 7,734,834 B2 * | 6/2010 | Yamamura | ........................ | 710/5 |
| 7,755,792 B2 * | 7/2010 | Sakayama et al. | ........... | 358/1.15 |
| 7,760,380 B2 * | 7/2010 | Suwabe | ........................ | 358/1.15 |

(Continued)

FOREIGN PATENT DOCUMENTS

CN  1629963  6/2005

(Continued)

OTHER PUBLICATIONS

Chinese Office Action dated Sep. 8, 2011 issued in CN Application No. 200810212509.7.

(Continued)

*Primary Examiner* — Frantz Coby
(74) *Attorney, Agent, or Firm* — Stanzione & Kim, LLP

(57) ABSTRACT

An image forming apparatus, an image forming system and a file managing method thereof include displaying a file list, selecting a deletion target file from the displayed file list, and storing the selected deletion target file in a temporary storing unit.

17 Claims, 5 Drawing Sheets

U.S. PATENT DOCUMENTS

| | | | |
|---|---|---|---|
| 2001/0029521 A1* | 10/2001 | Matsuda et al. | 709/201 |
| 2003/0079078 A1* | 4/2003 | Zipprich et al. | 711/112 |
| 2004/0027603 A1* | 2/2004 | Ueda et al. | 358/1.14 |
| 2005/0021497 A1* | 1/2005 | Kohno | 707/1 |
| 2008/0228788 A1* | 9/2008 | Kaneko | 707/100 |

FOREIGN PATENT DOCUMENTS

| | | |
|---|---|---|
| CN | 1642190 | 7/2005 |
| JP | 2004280417 | 10/2004 |
| KR | 2000-0013003 | 3/2000 |
| KR | 1020060019275 | 3/2006 |
| KR | 1020070047181 | 5/2007 |

OTHER PUBLICATIONS

Korean Office Action Issued on Jan. 30, 2012 in KR Patent Application No. 10-2007-0087671.

* cited by examiner

IMAGE FORMING APPARATUS, IMAGE FORMING SYSTEM AND FILE MANAGING METHOD THEREOF

CROSS-REFERENCE TO RELATED APPLICATIONS

This application claims priority under 35 U.S.C. §119(a) from Korean Patent Application No. 10-2007-0087671, filed on Aug. 30, 2007 in the Korean Intellectual Property Office, the disclosure of which is incorporated herein in its entirety by reference.

BACKGROUND OF THE INVENTION

1. Field of the Invention

The present general inventive concept relates to an image forming apparatus, an image forming system and a file managing method thereof for deleting a file, and more particularly, to an image forming apparatus, an image forming system and a file managing method thereof for restoring a deleted file, thereby assuring security of the file which is deleted.

2. Description of the Related Art

In general, an image forming apparatus is connected with a host, and forms a visible image on a printing medium based on a supplied image data. The image forming apparatus includes devices such as a printer, a facsimile, a digital copier, a multi function device, etc. The multi function device performs all functions including printing, scanning and facsimile functions.

As an example of a conventional image forming apparatus, the multi function device includes a function of deleting a document file which is stored in the multi function device for a printing, a scanning or a facsimile function.

If a user selects a deletion target file, and then pushes a deletion button, a confirming window which requests the user to confirm whether or not the selected document file is to be deleted is displayed. Here, if the user pushes a deletion confirming button, the selected document file is permanently deleted.

However, when the user deletes the document file which is stored in the multi function device, the user is apt to fail to recognize an importance of the corresponding document, or may inadvertently push the deletion confirming button by mistake. Also, if various users share the use of the multi function device, an important document file of one user is apt to be permanently deleted by the other users.

In this case, similar to the conventional multi function device, if the deletion target file is permanently deleted by pushing the deletion confirming button, the deletion target file is incapable of being restored.

SUMMARY OF THE INVENTION

The present general inventive concept provides an image forming apparatus, an image forming system and a file managing method thereof storing a document file selected as a deletion target file in a temporary storing unit, and restoring a deleted file to a wanted target as necessary.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept may be achieved by providing a file managing method of an image forming apparatus, including displaying a file list, selecting a deletion target file from the displayed file list, and storing the selected deletion target file in a temporary storing unit.

The storing in the temporary storing unit may include changing a property of the selected deletion target file.

The file list may be stored in a storing unit which includes at least one of a storage unit in the image forming apparatus, and a portable storage medium.

The portable storage medium may be detachably coupled to the image forming apparatus.

The storing in the temporary storing unit may include copying and storing the deletion target file in the temporary storing unit, and hiding a display of the deletion target file which is stored in the storing unit.

The file managing method of the image forming apparatus may further include displaying or searching a list of the hidden deletion target file from the file list which is stored in the storing unit.

The storing in the temporary storing unit may include moving and storing the deletion target file in the temporary storing unit.

The file managing method of the image forming apparatus may further include inquiring whether to delete the selected deletion target file.

The file managing method of the image forming apparatus may further include certifying a user to allow the user who has authority to select the deletion target file and to store the selected deletion target file in the temporary storing unit.

The selecting the deletion target file may include selecting the deletion target file by means of at least one which is selected between the image forming apparatus and a host which is connected to the image forming apparatus.

The file managing method of the image forming apparatus may further include restoring a restoration target file from the deletion target file which is stored in the temporary storing unit to a predetermined target which a user designates.

The restoring the restoration target file may include displaying at least one target and selecting at least one of the displayed target.

The at least one target may include at least one of an electronic mail, a file server, a storage unit in the image forming apparatus and a portable storage medium.

The restoring the restoration target file may further include inputting additional information according to the type of the at least one target.

The file managing method of the image forming apparatus may include permanently deleting a file which is selected by means of a user among at least one file which is stored in the temporary storing unit.

The foregoing and/or other aspects and utilities of the present general inventive concept may be achieved by providing an image forming apparatus, including a display unit which displays a list of at least one of a printing target file, a scanning target file and a communicating target file, a selecting unit which selects a deletion target file from the list of the file which is displayed on the display unit, a temporary storing unit which stores the selected deletion target file, and a control unit which displays the list of the file on the display unit, and stores the selected deletion target file in the temporary storing unit.

At least one of the printing target file, the scanning target file and the communicating target file may be stored in a storing unit which includes at least one of a storage unit in the image forming apparatus, and a portable storage medium which is connected to the image forming apparatus by a wire or a wireless connection.

The control unit may control the selected deletion target file to be copied or moved to be stored in the temporary storing unit, and the deletion target file in the storing unit may include a hidden file property which is not displayed on the display unit if the selected deletion target file is copied and stored in the temporary storing unit.

The image forming apparatus may further include a user certifying unit which certifies a user so that the user who has authority can select the deletion target file and store the selected deletion target file in the temporary storing unit and a permanent deleting unit which may permanently delete a file which is selected by means of the user from the deletion target file which is stored in the temporary storing unit.

The image forming apparatus may further include a restoring unit which restores a restoration target file from the deletion target file which is stored in the temporary storing unit to at least one target which a user designates among an electronic mail, a file server and the storing unit, and an information input unit which may input additional information according to the type of the at least one target.

The foregoing and/or other aspects and utilities of the present general inventive concept may be achieved by providing an image forming system, including an image forming apparatus including a display unit which displays a list of at least one of a printing target file, a scanning target file, and a communicating target file, a selecting unit which selects a deletion target file from the list of the file which is displayed on the display unit, a temporary storing unit which stores the selected deletion target file and a control unit which displays the list of the deletion target file on the display unit, and stores the selected deletion target file in the temporary storing unit and a host which is connected to the image forming apparatus to control the image forming apparatus.

The image forming system may further include a restoring unit which restores a restoration target file from the deletion target file which is stored in the temporary storing unit to at least one target which a user designates among an electronic mail, a file server, a storage unit in the image forming apparatus and a portable storage medium which is connected to the image forming apparatus by a wire or a wireless connection, and an information input unit which may input additional information according to the type of the target.

The deletion target file may be selected by means of at least one of the image forming apparatus and the host.

The foregoing and/or other aspects and utilities of the present general inventive concept may be achieved by providing an image forming apparatus, including a temporary storing unit and a control unit to generate a signal representing a list of one or more files, to select at least one of the files as a deletion target file from the list and to store the selected deletion target file within the temporary storing unit.

The control unit may further restore the selected deletion target file within the temporary storing unit.

The foregoing and/or other aspects and utilities of the present general inventive concept may be achieved by providing an image forming apparatus, including a storing unit to store one or more files, a temporary storing unit, an image forming unit and a control unit to control the image forming unit to print one of the files of the storing unit, to select one of the files as a deletion target file, and to store the selected deletion target file in the temporary storing unit.

The control unit may further restore or permanently delete the selected deletion target file within the temporary storing unit.

BRIEF DESCRIPTION OF THE DRAWINGS

These and/or other aspects and utilities of the present general inventive concept will become apparent and more readily appreciated from the following description of the exemplary embodiments, taken in conjunction with the accompanying drawings, in which.

DETAILED DESCRIPTION OF THE PREFERRED EMBODIMENT

Figure 1:
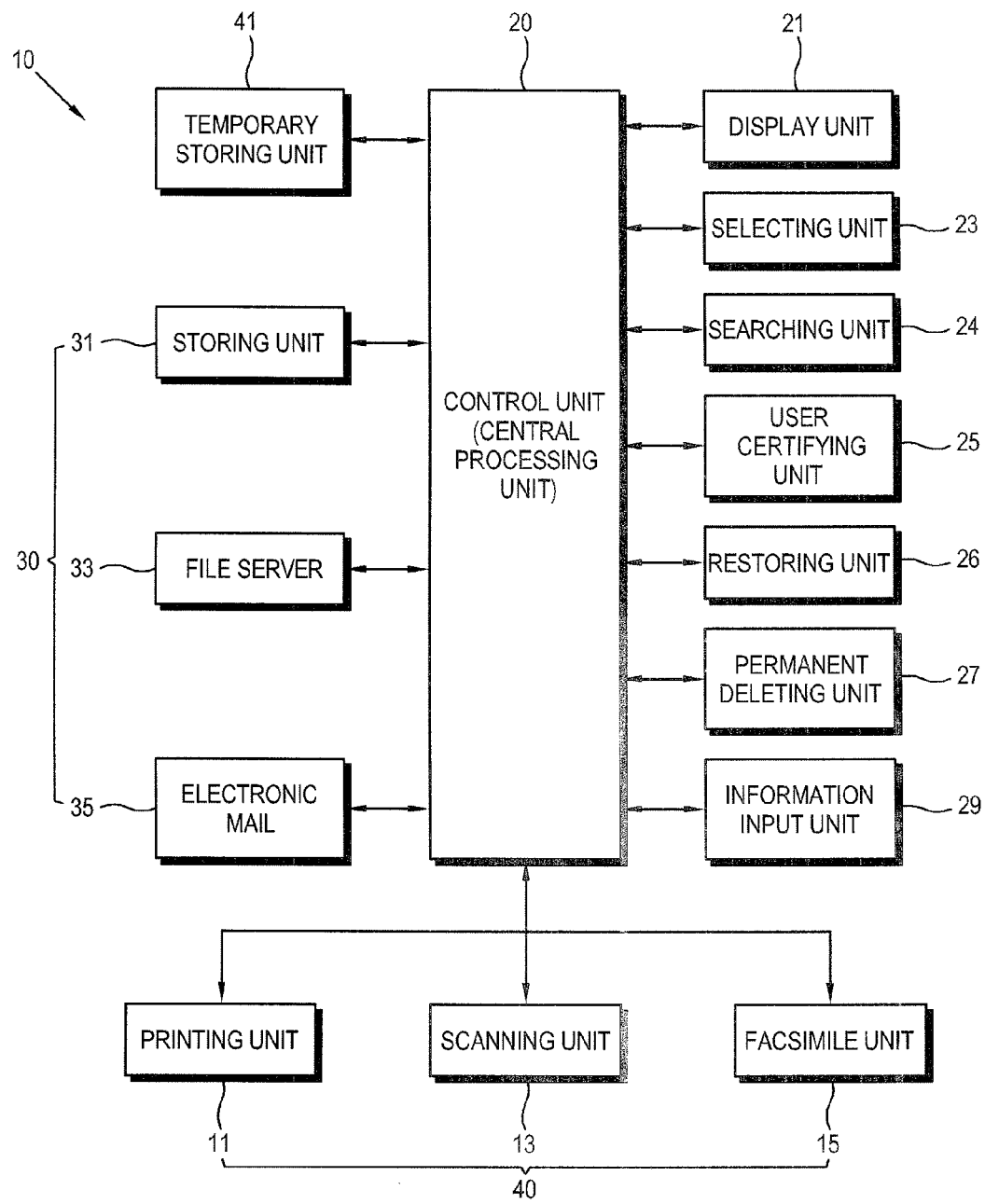
FIG. 1 is a block diagram illustrating an image forming apparatus according to an exemplary embodiment of the present general inventive concept.

Reference will now be made in detail to exemplary embodiments of the present general inventive concept, examples of which are illustrated in the accompanying drawings, wherein like reference numerals refer to like elements throughout. The exemplary embodiments are described below in order to explain the present general inventive concept by referring to the figures.

Figure 2:
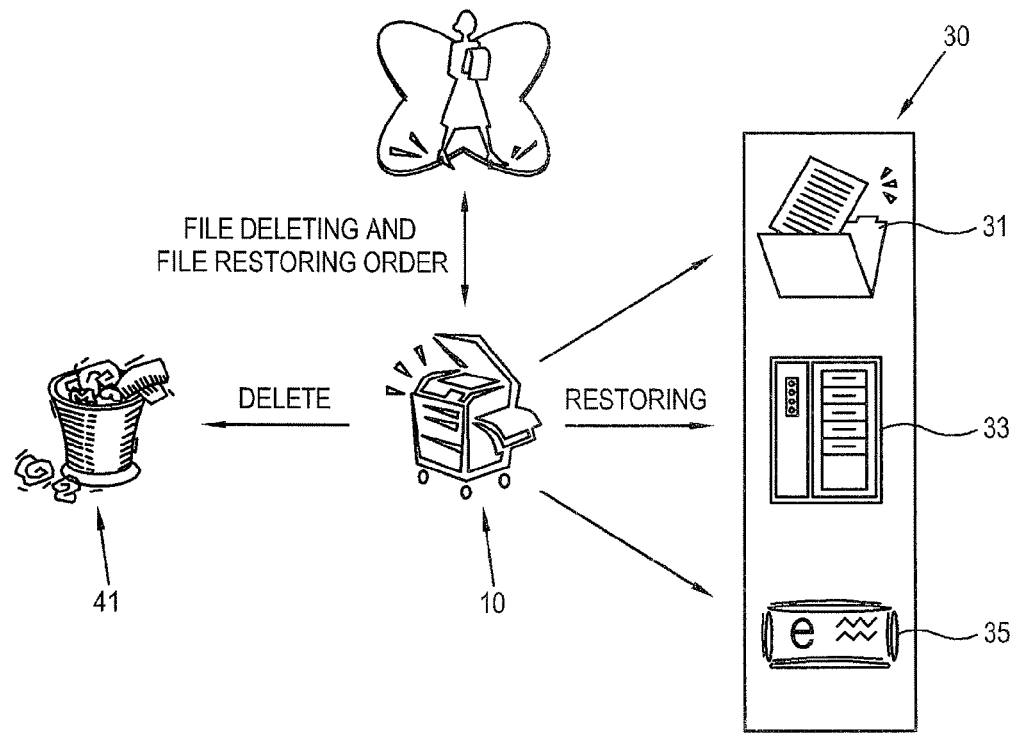
FIG. 2 is a schematic view illustrating an operation of the image forming apparatus according to the exemplary embodiment of the present general inventive concept.

FIG. 1 is a block diagram illustrating an image forming apparatus according to an exemplary embodiment of the present general inventive concept, and FIG. 2 is a schematic view illustrating an operation of the image forming apparatus according to the exemplary embodiment of the present general inventive concept.

As illustrated in FIG. 1, an image forming apparatus 10 includes a control unit 20 (central processing unit) which controls an image forming unit 40, a display unit 21 to display an image process state, and a selecting unit 23.

The image forming unit 40 includes at least one of a printing unit 11, a scanning unit 13 to scan a document, and a facsimile unit 15 to transmit and receive a data through wire or wireless communication devices. Here, at least one of a printing target file, a scanning target file and a data communicating target file is stored in a storing unit 31.

The storing unit 31 stores a file transmitted to or from the image forming unit 40, for example, the printing target file, the scanning target file or the data communicating target file, and the storing unit 31 includes a storage unit (not illustrated) provided in the image forming apparatus 10, or a portable storage medium (not illustrated) connected to the image forming apparatus 10 by a wire and/or by a wireless connection.

The storing unit 31 may be provided as a memory element and/or a hard disk, and includes an inbox having a directory concept and/or a folder to systemically manage a stored file. The storing unit 31 may be provided as a target of a file restoration.

The display unit 21 is controlled by the control unit 20 and displays information necessary for an image processing, which includes a file list stored in the storing unit 31. Accordingly, a user can obtain information about the image forming apparatus 10 based on the information displayed on the display unit 21.

The selecting unit 23 selects a deletion target file from the file list of the storing unit 31 which is displayed on the display unit 21. The selected deletion target file is then moved and/or copied to the temporary storing unit 41 and stored therein.

In an exemplary embodiment, the control unit 20 controls the selected deletion target file which is to be stored in the temporary storing unit 41.

In more detail, the control unit 20 controls the selected deletion target file to be copied and stored in the temporary storing unit 41, and controls the deletion target file in the storing unit 31 to have a hidden file property which is not displayed on the display unit 21, under a normal condition. Accordingly, when the user views the file list of the files stored in the storing unit 31, the selected deletion target file is not displayed on the display unit 21. In an exemplary embodiment, the control unit 20 may control a file stored in the storing unit 31 and allow the hidden file property to be displayed on the display unit 21 by means of selection by the user of whether it is necessary to display the file which includes the hidden file property. In addition, the image forming apparatus 10 may further include a searching unit 24 so that the file which includes the hidden file property can be easily searched.

Meanwhile, the control unit 20 may control the selected deletion target file to be moved from the storing unit 31 and stored in the temporary storing unit 41. In this case, the selected deletion target file is deleted from the storing unit 31.

Also, the control unit 20 may inquire whether or not to delete the selected deletion target file. For example, if the deletion target file is selected from the file list displayed on the display unit 21 through the selecting unit 23, the control unit 20 may display a message which requests the user to confirm whether or not to delete the selected deletion target file displayed on the display unit 21. Accordingly, a wanted file can be prevented from being deleted due to carelessness of the user.

In an exemplary embodiment, the control unit 20 is used to control the image forming unit 40 to either print, scan or fax a file stored within the predetermined target 30, to select a deletion target file, to store the selected deletion target file within the temporary storing unit 41, and to restore or permanently delete the selected deletion target file, which is stored within the temporary storing unit 41.

In an alternative exemplary embodiment, the control unit 20, the predetermined target 30, the image forming unit 40, and the temporary storing unit 41 may be integrated into a single device.

The temporary storing unit 41 stores the deleted file, and may be provided as a memory element and/or a hard disk, similar to the storing unit 31. Also, the temporary storing unit 41 may be physically provided to be integral with the storing unit 31, and/or may be independently provided by a partition.

The image forming apparatus 10 may further include a user certifying unit 25. The user certifying unit 25 only allows a user having authority to select the deletion target file and to store the deletion target file in the temporary storing unit 41. In more detail, an ID and a password are endowed to each user, and the user is capable of accessing the image forming apparatus 10 by using an ID and corresponding password. Also, a property of the file stored in the storing unit 31 includes information about a user who generated the file. Accordingly, the user certifying unit 25 allows the corresponding file to be deleted if the accessing user accords or corresponds to the user who generated the file. Also, the user certifying unit 25 may endow the authority to a user who satisfies a predetermined condition as well as the according user having the same information.

Also, the image forming apparatus 10 may further include a restoring unit 26. The restoring unit 26 restores a restoration target file in the file stored in the temporary storing unit 41. Here, a restoration position is a predetermined target 30 which the user designates. Here, the target 30 may be the storing unit 31, a file server 33 and/or an electronic mail 35. Accordingly, the restoring unit 26 is provided such that the user can arbitrarily determine the restoration position in restoring the deleted file, thereby improving convenience of the user.

However, if the user does not designate the restoration position, at least one of the storing unit 31, the file server 33 and the electronic mail 35 may be determined as a default value. In an exemplary embodiment, the storing unit 31 may be determined as the default value of the restoration position. In this case, if the user does not designate the restoration position, the inbox or the folder of the storing unit 31 is displayed on the display unit 21.

In an exemplary embodiment, an information input unit 29 may be further provided to input additional information according to the type of the target 30. The information input unit 29 for each target 30 is described as follows.

If the storing unit 31 is selected as the target 30, the inbox or the folder list of the storing unit 31 is displayed on the display unit 21 as the information input unit 29. Accordingly, the user can determine the restoration position by selecting the displayed list.

If the electronic mail 35 is selected as the target 30, the user inputs an address of the electronic mail 35 through the information input unit 29 such that the deleted file can be restored to the inputted address of the electronic mail 35. Also, if the file server 33 is selected as the target 30, the user inputs an internet protocol, a port, a user ID and a password of a server through the information input unit 29 such that the deleted file can be restored and transmitted to the selected file server 33. Here, the file restoration through the electronic mail 35 and the file server 33 may be available if the image forming apparatus 10 according to the present exemplary embodiment of the present general inventive concept is connected to a communication network such as an internet, etc.

Also, the image forming apparatus 10 may further include a permanent deleting unit 27 to permanently delete a file which the user designates in the file stored in the temporary storing unit 41. Accordingly, a capacity shortage due to accumulation of the deleted file in the temporary storing unit 41 can be prevented or alleviated.

Figure 3:
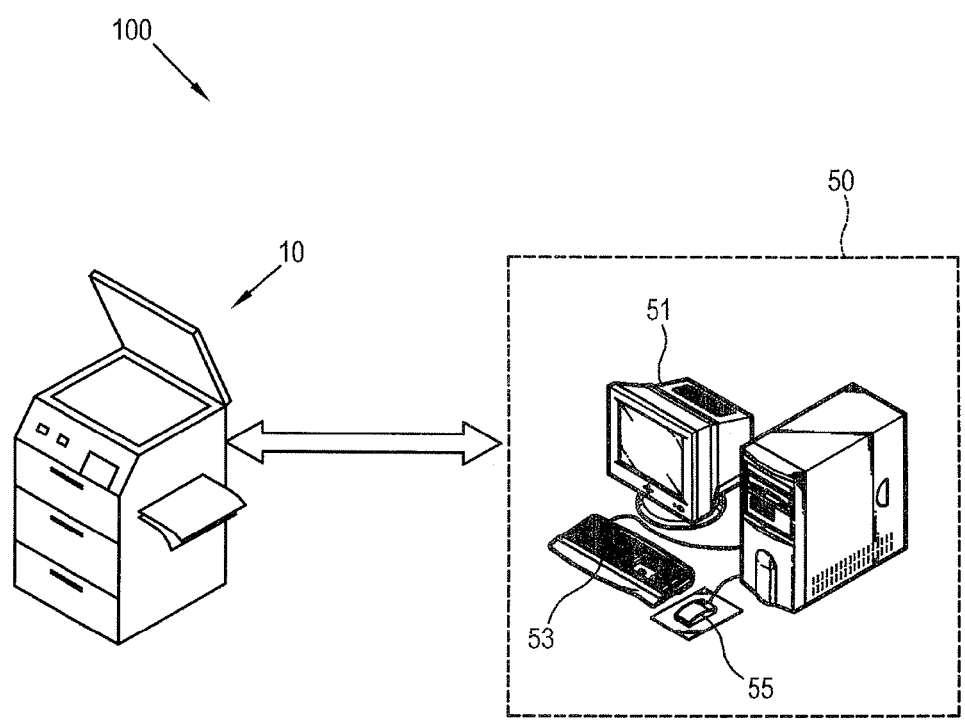
FIG. 3 is a schematic view illustrating an image forming system according to an exemplary embodiment of the present general inventive concept.

FIG. 3 is a schematic view illustrating an image forming system according to an exemplary embodiment of the present general inventive concept.

As illustrated in FIG. 3, the image forming system according to the present exemplary embodiment includes an image forming apparatus 10, and a host 50 connected to the image forming apparatus 10. The image forming apparatus 10 may have the same configuration as the image forming apparatus 10 according to the exemplary embodiment of the present general inventive concept described by referring to FIGS. 1 and 2.

In an exemplary embodiment, the image forming apparatus 10 may be connected with the host 50 through a serial bus, a parallel bus or a network, and the image forming apparatus 10 may be controlled through the host 50.

In the present exemplary embodiment, a deletion target file may be selected through the host 50 as well as through the selecting unit 23, as illustrated in FIG. 1 described above. That is, a file information about the image forming apparatus 10 may be displayed on a display 51 provided to the host 50, and a user may select the displayed deletion target file by using a keyboard 53 and/or a mouse 55.

Hereinafter, a deleting process and a restoring process of a file managing method of an image forming apparatus according to an exemplary embodiment of the present general inventive concept will be described by referring to FIGS. 4 and 5.

Figure 4:
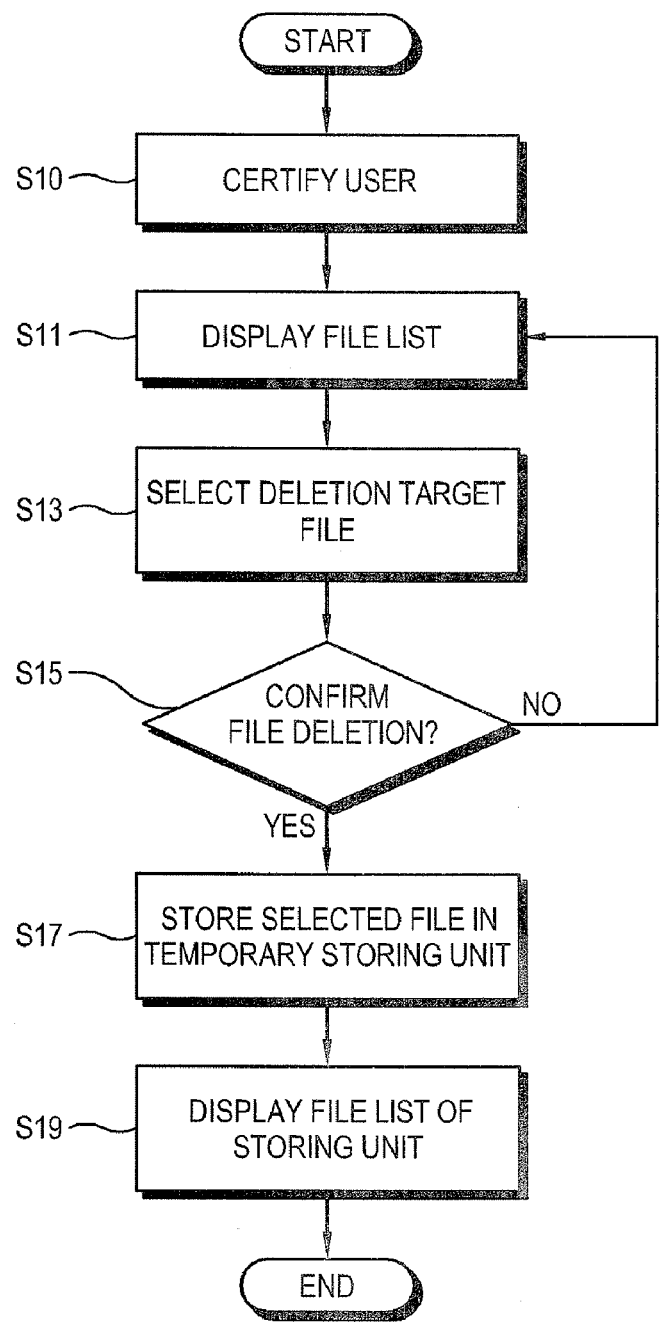
FIG. 4 is a flowchart illustrating a deleting process of a file managing method of an image forming apparatus according to an exemplary embodiment of the present general inventive concept.

FIG. 4 is a flowchart illustrating a deletion process of the file managing method of the image forming apparatus according to the exemplary embodiment of the present general inventive concept.

Referring to FIGS. 1 and 4, the deletion process of the file managing method includes an operation of displaying a file list (S11), an operation of selecting a deletion target file (S13), and an operation of storing the selected deletion target file in a temporary storing unit 41 (S17).

In the operation S11, the file list which is stored in a storing unit 31 is displayed on a display unit 21 by means of selection by a user. The storing unit 31 may include a storage unit (not illustrated) provided in the image forming apparatus 10, or a portable storage medium (not illustrated) detachably coupled to the image forming apparatus 10.

The operation of selecting the deletion target file (S13) includes an operation of selecting the deletion target file from the file list displayed on the display unit 21. The selection of the deletion target file may be performed through a selecting unit 23 of the image forming apparatus 10 and/or a host 50 which is connected to the image forming apparatus 10.

An operation of inquiring whether or not to delete the selected deletion target file may be further provided (S15). In the operation S15, it is determined whether or not to delete the selected file is confirmed if a deletion order with respect to the selected file is applied. In the operation S15, the operation S17 is performed if the deletion is confirmed, and the operation S11 is performed again if the deletion is not confirmed.

In the operation S17, the file selected in the storing unit 31 is stored in the temporary storing unit 41. In an exemplary embodiment, the operation S17 may be classified into two operations. That is, in the operation S17, the selected file may be copied and stored in the temporary storing unit 41, or may be moved and stored in the temporary storing unit 41.

In the operation S17, if the deletion target file is copied and stored in the temporary storing unit 41, a property of the deletion target file is changed in order to hide a display of the deletion target file which is stored in the storing unit 31. In this case, an operation may be further provided of displaying a list of the hidden deletion target files among the files stored in the storing unit 31, and also an operation of searching the list of the hidden deletion target files.

In another exemplary embodiment, in the operation S17, if the deletion target file is moved and stored in the temporary storing unit 41, the selected deletion target file is deleted from the storing unit 31.

Then, after the file deletion, a property change of the deletion target file, or the file list of the storing unit 31 is displayed on the display unit 21 (S19), which thereby completes the file deleting process.

Also, the file deleting process may further include a user certifying operation (S10). The operation S10 certifies a user having authority, and only allows the user with the authority to perform selecting the deletion target file and storing the selected deletion target file in the temporary storing unit 41. Accordingly, the file stored in the storing unit 31 can be prevented from being arbitrarily deleted by means of a user having no authority, thereby improving a file managing security.

Figure 5:
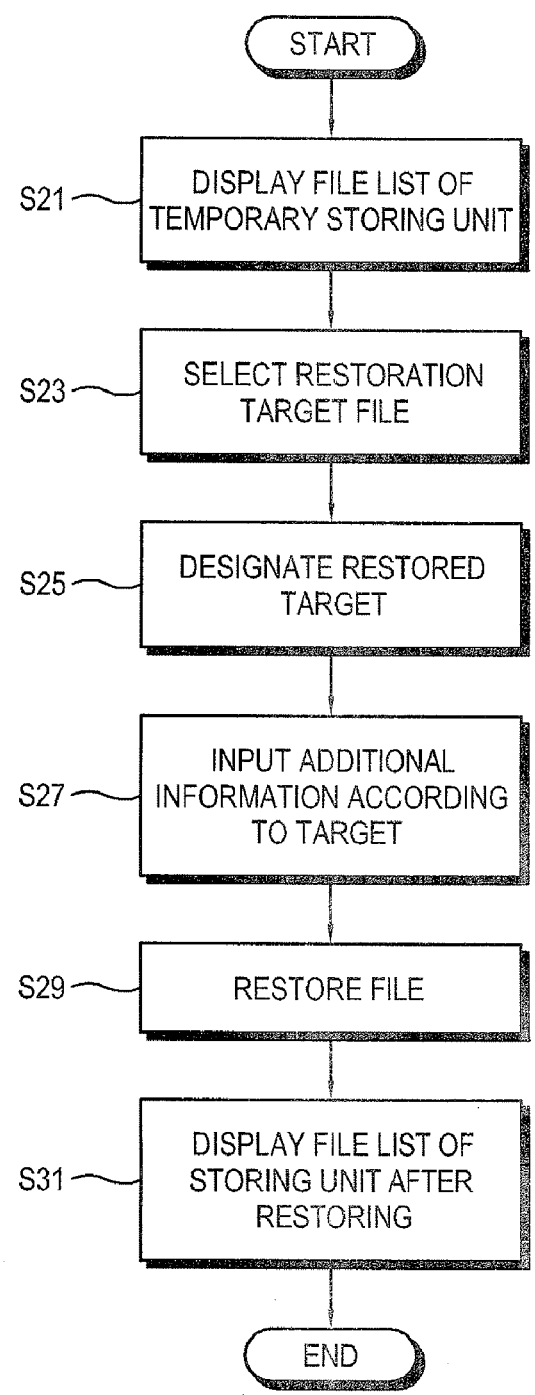
FIG. 5 is a flowchart illustrating a restoring process of the file managing method of the image forming apparatus according to the exemplary embodiment of the present general inventive concept.

FIG. 5 is a flowchart illustrating a restoring process of the file managing method of the image forming apparatus according to the exemplary embodiment of the present general inventive concept.

Referring to FIGS. 1 and 5, the file restoring process of the file managing method includes an operation of restoring a restoration target file among the files stored in the temporary storing unit 41 to a predetermined target 30, which a user designates. In more detail, the file restoring process includes an operation of displaying a file list of the temporary storing unit 41 (S21), an operation of selecting the restoration target file (S23), an operation of designating the target 30 to which the file is restored (S25) to, and an operation of restoring the file (S29). Here, the target 30 may include at least one of the storing unit 31, a file server 33 and an electronic mail 35. Alternatively, the operation S25 may be performed based on a predetermined default value, instead of designation by the user.

Also, the file restoring process may further include an operation of inputting additional information according to the type of the target 30 (S27). Here, the operation of inputting the additional information according to the type of the target 30 may have the same configuration as the image forming apparatus 10 according to the exemplary embodiment as described above. Also, the file restoring process of the file managing method may further include an operation of permanently deleting a file which the user selects among the files stored in the temporary storing unit 41 (not illustrated).

In the operation S29, the file is restored from the temporary storing unit 41 to the target 31 designated by the user or selected by the default value. Then, after the restoration, a file list of the storing unit 31 is displayed on the display unit 21 (S31), which thereby completes the file restoring process.

In the image forming apparatus and the file managing method thereof according to the present general inventive concept, although a user deletes a document file, the document file can be restored. Accordingly, the impossibility of file restoration due to the permanent deletion of the file by conventional devices can be solved. Also, since the user is capable of designating the restoration position in restoring, the file can be restored to various positions as well as an original position. Also, in restoring the file to the storing unit, since the user is capable of directly selecting the folder or the inbox, it is possible to designate a position different from the folder or the inbox of an original deleted position.

According to the image forming apparatus, the image forming system and the file managing method thereof according to the present general inventive concept, although a file stored in the storing unit is deleted, the file is copied or moved and stored in the temporary storing unit, without being permanently deleted. Accordingly, in spite of the file being deleted from the storing unit, the user can restore the file as necessary, thereby assuring a security in deleting a file.

Also, since the user can designate a wanted target to restore the file in restoring, the restored file can be moved and restored to various positions needing the restored file in addition to the original deleted position. Also, since the user can directly select the folder or the inbox in restoring the file to the storing unit, it is possible to designate a position different from the folder or the inbox of the original deleted position, thereby improving convenience of the user. Also, the restored file can be reused to work of the image forming apparatus, for example, printing, scanning or facsimile working.

Also, the image forming apparatus according to the present general inventive concept further includes a user certifying unit to only allow a user having authority to select a deletion target file and to store this file in the temporary storing unit.

Accordingly, a file stored in the storing unit by means of a first user can basically be prevented from being deleted by means of selection by a second user with no authority.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A file managing method of an image forming apparatus, the method comprising:
    displaying a file list of at least one of a printing target file, a scanning target file and a communicating target file which is stored in a main storing unit;
    selecting a deletion target file from the displayed file list by means of at least one which is selected between the image forming apparatus and a host which is connected to the image forming apparatus;
    storing the deletion target file in a temporary storing unit; and
    restoring a restoration target file from the deletion target file which is stored in the temporary storing unit to at least one target which a user designates among an electronic mail, a file server and the main storing unit.

2. The file managing method of claim 1, wherein the storing in the temporary storing unit includes changing a property of the selected deletion target file.

3. The file managing method of claim 1, wherein the main storing unit comprises at least one of a storage unit in the image forming apparatus, and a portable storage medium.

4. The file managing method of claim 3, wherein the storing in the temporary storing unit comprises copying and storing the deletion target file in the temporary storing unit, and hiding a display of the deletion target file which is stored in the main storing unit.

5. The file managing method of claim 4, further comprising:
    displaying or searching a list of the hidden deletion target file in the file list which is stored in the main storing unit.

6. The file managing method of claim 1, wherein the storing in the temporary storing unit comprises moving and storing the deletion target file in the temporary storing unit, and deleting a display of the deletion target file which is stored in the main storing unit.

7. The file managing method of claim 1, further comprising:
    inquiring whether to delete the selected deletion target file from the main storing unit.

8. The file managing method of claim 1, further comprising:
    certifying a user to allow the user who has authority to select the deletion target file and to store the selected deletion target file in the temporary storing unit.

9. The file managing method of claim 1, wherein the restoring of the restoration target file further comprises inputting additional information according to a type of the at least one target.

10. The file managing method of claim 1, further comprising:
    permanently deleting a file which is selected by means of a user among at least one file which is stored in the temporary storing unit.

11. An image forming apparatus, comprising:
    a display unit which displays a list of at least one file which is stored in a main storing unit which stores at least one of a printing target file, a scanning target file and a communicating target file;
    a selecting unit which selects a deletion target file from the list of the at least one file which is displayed on the display unit by means of at least one which is selected between the image forming apparatus and a host which is connected to the image forming apparatus;
    a temporary storing unit which stores the selected deletion target file; and
    a control unit which displays the list of the at least one file on the display unit, stores the selected deletion target file in the temporary storing unit, and restores a restoration target file from the deletion target file which is stored in the temporary storing unit to at least one target which a user designates among an electronic mail, a file server and the main storing unit.

12. The image forming apparatus of claim 11, wherein the main storing unit comprises at least one of a storage unit in the image forming apparatus, and a portable storage medium is connected to the image forming apparatus by a wire or a wireless connection.

13. The image forming apparatus of claim 12, wherein the control unit controls the selected deletion target file to be copied or moved to be stored in the temporary storing unit, and
    the deletion target file in the main storing unit includes a hidden file property which is not displayed on the display unit if the selected deletion target file is copied and stored in the temporary storing unit.

14. The image forming apparatus of claim 12, further comprising:
    a user certifying unit which certifies a user so that the user who has authority can select the deletion target file and store the selected deletion target file in the temporary storing unit; and
    a permanent deleting unit which permanently deletes a file which is selected by means of the user from the deletion target file which is stored in the temporary storing unit.

15. The image forming apparatus of claim 12, further comprising:
    an information input unit which inputs additional information according to the type of the at least one target.

16. An image forming system, comprising:
    an image forming apparatus comprising:
        a display unit which displays a list of at least one file which is stored in a main storing unit which stores at least one of a printing target file, a scanning target file and a communicating target file;

a selecting unit which selects a deletion target file from the list of the at least one file which is displayed on the display unit by means of at least one which is selected between the image forming apparatus and a host which is connected to the image forming apparatus;

a temporary storing unit which stores the selected deletion target file; and a control unit which displays the list of the deletion target file on the display unit, stores the selected deletion target file in the temporary storing unit, and restores a restoration target file from the deletion target file which is stored in the temporary storing unit to at least one target which a user designates among an electronic mail, a file server and the storing unit; and a host which is connected to the image forming apparatus to control the image forming apparatus.

17. The image forming system of claim 16, further comprising:

an information input unit which inputs an additional information according to the type of the target.

* * * * *